US006225405B1

(12) United States Patent
Yamaguchi et al.

(10) Patent No.: US 6,225,405 B1
(45) Date of Patent: May 1, 2001

(54) WATER AND OIL-REPELLENT RESIN COMPOSITION

(75) Inventors: Fumihiko Yamaguchi; Yoshitaka Honda, both of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/284,261

(22) PCT Filed: Oct. 8, 1997

(86) PCT No.: PCT/JP97/03621

§ 371 Date: May 7, 1999

§ 102(e) Date: May 7, 1999

(87) PCT Pub. No.: WO98/15598

PCT Pub. Date: Apr. 16, 1998

(30) Foreign Application Priority Data

Oct. 9, 1996 (JP) .................................................. 8-268802
Dec. 11, 1996 (JP) .................................................. 8-330683

(51) Int. Cl.⁷ .............................. A62C 5/02; A62C 5/033; A62C 31/07
(52) U.S. Cl. .............................. 525/55; 525/116; 525/199
(58) Field of Search ................................. 525/55, 116, 199

(56) References Cited

U.S. PATENT DOCUMENTS

| 4,182,846 | 1/1980 | Saegusa et al. |
| 4,250,300 | 2/1981 | Saegusa et al. |
| 6,035,911 | * 3/2000 | Matsumoto et al. ............... 152/209.5 |

FOREIGN PATENT DOCUMENTS

| 0152065-A2 | 8/1985 | (EP) . |
| 1271873-A2 | 6/1988 | (EP) . |
| 2035327 | 6/1980 | (GB) . |
| 55-60517 | 5/1980 | (JP) . |
| 57-11324-B2 | 3/1982 | (JP) . |
| 57-11325-B2 | 3/1982 | (JP) . |
| 60-215023 | 10/1985 | (JP) . |
| 63-199724 | 8/1988 | (JP) . |
| 1006046 | 1/1989 | (JP) . |
| 1131270 | 5/1989 | (JP) . |
| 1138527 | 5/1989 | (JP) . |
| 03007745 | 1/1991 | (JP) . |
| 03041162 | 2/1991 | (JP) . |
| 04068006 | 3/1992 | (JP) . |
| 4149268 | 5/1992 | (JP) . |
| 06116340 | 4/1994 | (JP) . |
| 7011092 | 1/1995 | (JP) . |
| 7011104 | 1/1995 | (JP) . |
| 7268185 | 10/1995 | (JP) . |
| 8151503 | 6/1996 | (JP) . |
| 8333439 | 12/1996 | (JP) . |
| 09039061 | 2/1997 | (JP) . |

OTHER PUBLICATIONS

European Search Report dated Jun. 4, 1999.

* cited by examiner

*Primary Examiner*—Nathan M. Nutter
(74) *Attorney, Agent, or Firm*—Birch, Stewart, Kolasch & Birch, LLP

(57) ABSTRACT

A resin composition comprising 100 parts by weight of a thermoplastic resin or thermosetting resin and 0.1 to 5 parts by weight of at least one perfluoroalkyl group-containing polymer selected from the group consisting of a copolymer of a (meth)acrylic ester having a perfluoroalkyl group of 5–18 carbon atoms and a (meth)acrylic ester having a hydrophilic group, a homopolymer of an epoxy compound having a perfluoroalkyl group of 5–18 carbon atoms, and a copolymer of said epoxy compound and a monomer copolymerizable therewith has excellent stain resistance, and is suitable for producing molded products undergoing severe adhesion of dirt such as kitchen wares, bathroom wares and the like.

13 Claims, No Drawings

WATER AND OIL-REPELLENT RESIN COMPOSITION

This application is the national phase under 35 U.S.C. §371 of PCT International Application No. PCT/JP97/03621 which has an International filing date of Oct. 8, 1997, which designated the United States of America.

FIELD OF THE INVENTION

The present invention relates to water and oil repellent resin compositions, molded articles thereof, and a process for producing such molded articles. More particularly, it relates to resin compositions wherein specific perfluoroalkyl group-containing polymers are blended with thermoplastic resins or thermosetting resins, and to resin molded articles having excellent water and oil repellency obtained by molding such compositions, and a process for producing the same. In particular, the resin compositions of the present invention have excellent stain resistance, and are suitable for producing molded products undergoing severe adhesion of dirt such as kitchen wares, bathroom wares and the like.

DESCRIPTION OF THE RELATED ART

As means to impart liquid-repellency to the surface of resins, those methods are conventionally used in which, for example, (1) the surface of molded products is coated with compounds having a low surface tension or (2) compounds having a low surface tension are melt blended with the resins. It is desired, if possible, in terms of both the process and the practical use to impart the liquid repellency by the above method (2), since the method (1) requires an additional proofing process in which the products once molded are further processed, and the compounds used for coating the surface are easily exfoliated by friction or other causes to lose their effects over time.

As compounds having a low surface tension, fluorine compounds are well known, and perfluoro-compounds are preferred among others. When commercially available perfluoroalcohols, perfluorocarboxylic acids, or esters derived therefrom are compounded as they are in resins, the water and oil repellency is not necessarily imparted, or shows poor durability although it is temporarily imparted.

For this reason, in Japanese Patent Publication (Kokai) Nos. H-7745 and H3-41162, homopolymers or copolymers of acrylic esters having perfluoroalkyl groups were melt kneaded with thermoplastic resins or olefin resins to increase the liquid repellency of the resins. The property modifications of thermoplastic resins according to such prior art, however, have some drawbacks in that, for example, it is difficult to obtain products having an adequate liquid repellency, or the oil repellency can not be developed even though the water repellency can be attained.

SUMMARY OF THE INVENTION

An object of the present invention is to provide water and oil repellent resin compositions which do not have the drawbacks of prior art as described above, as well as molded articles thereof and a method of molding the same.

To achieve the above object, the present invention provides (i) a resin composition comprising 100 parts by weight of a thermoplastic resin or a thermosetting resin and 0.1 to 5 parts by weight of at least one perfluoroalkyl group-containing polymer selected from the group consisting of a copolymer of a (meth)acrylic ester having a perfluoroalkyl group of 5–18 carbon atoms and a (meth)acrylic ester having a hydrophilic group, a homopolymer of an epoxy compound having a perfluoroalkyl group of 5–18 carbon atoms, and a copolymer of said epoxy compound and a monomer copolymerizable therewith, (ii) a process for producing a resin molded article, comprising molding said resin composition followed by heat treatment at 70–130° C., and (iii) a resin molded article produced by the above process.

DETAILED DESCRIPTION OF THE INVENTION

Examples of the (meth)acrylic ester having a perfluoroalkyl group of 5–18 carbon atoms used in the present invention include (meth)acrylic esters having a linear or branched perfluoroalkyl group such as

Among others, (meth)acrylic esters of 8–12 carbon atoms are preferred. These esters may be used singly or in combination with one or more other such esters.

Examples of the hydrophilic group in the (meth)acrylic ester having a hydrophilic group include hydroxyl, polyethylene glycol, polypropylene glycol, and carboxyl groups as well as carbonium salts.

Specific examples of the (meth)acrylic ester having a hydrophilic group include:

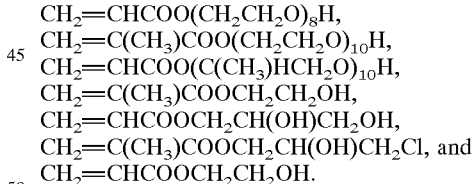

The weight ratio of the (meth)acrylic ester having a perfluoroalkyl group to the (meth)acrylic ester having a hydrophilic group in the copolymer is 1:10 to 10:1, and in particular, 1:2 to 2:1.

In addition to these two essential monomers, at least one of third monomers copolymerizable with such monomers may be used in the copolymerization in an amount such that the liquid repellency is not impaired.

Examples of such third copolymerizable monomer include vinyl acetate, vinyl chloride, styrene, α-methylstyrene, ($C_1$–$C_{25}$)alkyl esters of (meth)acrylic acid, ($C_6$–$C_{30}$)aromatic esters of (meth)acrylic acid, and (meth)acrylic acid amides.

Since the liquid repellency of the copolymer increases as the amount of the third monomers decreases, the third monomer(s) may be used in an amount from 0 to 50% by weight based on the total amount of the two essential monomers described above, especially in view of the oil-repellency. More preferably, the third monomers are not used.

Depending on the intended liquid, however, use of such third monomers may strengthen the anchor effect to resins and result in an increased durability of the liquid repellency. In such cases, long chain (8–22 carbon atoms) alkyl esters of (meth)acrylic acid are preferred as the third monomers.

The mode of polymerization for the preparation of perfluoroalkyl group-containing polymers using such monomers may be any one of bulk polymerization, solution polymerization, suspension polymerization, and emulsion polymerization, and in addition to thermal polymerization, other methods such as photopolymerization or radiation polymerization can also be adopted. As a polymerization initiator, a known polymerization initiator such as an organic azo compound, a peroxide, or a persulfate may be used.

The molecular weight of the copolymer is preferably 1,000 to 1,000,000, and more preferably 2,000 to 10,000, since a lower molecular weight decreases the durability of the water and oil repellency although the initial water and oil repellency increases, while a higher molecular weight decreases the water and oil repellent function because of decrease in the bleeding out property towards the surface.

A molecular weight can be easily regulated using commercially available chain transfer agents (e.g., mercaptan, α-methylstyrene, carbon tetrachloride, etc.).

Epoxy compounds having a perfluoroalkyl group of 5–18 carbon atoms used in the present invention may be exemplified by the compounds of the following general formula:

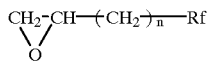

(wherein n is 0, 1 or 2 and Rf represents a perfluoroalkyl group having 5–18 carbon atoms), and specific examples may be:

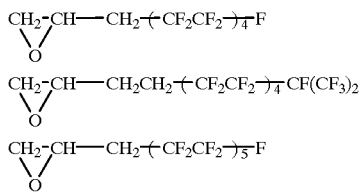

Examples of the monomer which is copolymerizable with the epoxy compound having a perfluoroalkyl group include cyclic acid anhydrides such as succinic anhydride, maleic anhydride, phthalic anhydride, and acetic anhydride, cyclic ethers such as tetrahydrofuran and oxetane, cyclic formals such as dioxolane and trioxane, and cyclic epoxides such as propylene oxide, styrene oxide, and epichlorohydrin. The amount of the copolymerizable monomer is 90% by weight or less of the copolymer, for example, in the range of 10–80% by weight.

The homopolymerization or copolymerization of the above epoxy compound is generally performed by solution polymerization or bulk polymerization in the presence of a catalyst. The molecular weight of the homopolymer or copolymer of the epoxy compound may be 1,000 to 1,000,000.

According to the present invention, 0.1 to 5 parts by weight of at least one of the perfluoroalkyl group-containing polymers as described above is added to 100 parts by weight of a thermoplastic resin or thermosetting resin. If the amount of the added perfluoroalkyl group-containing polymer is less than 0.1 part by weight, an adequate water and oil repellent effect is not developed. An amount exceeding 5 parts by weight is disadvantageous in terms of costs and also causes the deterioration of compatibility with the resin. The more preferred range is 0.5 to 3 parts by weight.

The thermoplastic resins used in the present invention may be any one of conventionally known thermoplastic resins, and examples are polyethylene, polypropylene, polyvinyl chloride, polystyrene, acrylic resins, polyesters, polycarbonates, polyamides and the like.

As an apparatus for blending the perfluoroalkyl group-containing polymer and the thermoplastic resin, any of a single screw extruder, a twin screw extruder, an open roll mill, a kneader, a mixer and the like may be adopted.

The thermoplastic resin composition thus obtained may be molded by a known method such as extrusion molding, injection molding, compression molding, film formation or the like to produce molded articles having water and oil repellency.

The thermosetting resin used in the present invention may be any one of conventionally known thermosetting resins, and examples are epoxy resins, phenolic resins, urea resins, melamine resins, alkyd resins, unsaturated polyester resins, DAP resins, polyurethanes, silicone resins and the like.

The perfluoroalkyl group-containing polymer and thermosetting resin may be suitably blended together by directly mixing them before molding of the thermosetting resin (before adding a hardening agent or before heating).

The thermosetting resin composition thus obtained may be molded by a known method such as injection molding (heat hardening), compression molding, transfer molding or the like to produce molded articles having a water and oil repellency.

In order to allow the molded products of these thermoplastic resin compositions or thermosetting resin compositions to fully exert their water and oil repellency, the products requires to be further heat-treated after the molding.

The heat treatment is conducted by keeping the molded articles in a heating oven for a given period of time at a temperature typically in the range of 70 to 130° C., and preferably in the range of 80 to 120° C.

In addition to the perfluoroalkyl group-containing polymers, various additives, which are usually added to thermoplastic resins or thermosetting resins, for example, fillers, colorants, antistatic agents, antibacterial agents and the like, may also be added to the thermoplastic resin composition or thermosetting resin composition of the present invention, in an amount not to impair the water and oil repellency.

Since the thermoplastic resin compositions or thermosetting resin compositions of the present invention contain specific perfluoroalkyl group-containing polymers, they are superior in the water and oil repellency, and therefore, molded articles obtained from such compositions show excellent properties such as stain resistance or mold release characteristics at the time of molding, and can be applied to molded products undergoing severe adhesion of dirt such as kitchen wares, bathroom wares and the like.

Specific examples of application of such molded articles include:

bathroom wares such as a bathtub, interior trims of bathroom units, a wash basin, a pail, a soap stand, a soap dish, a shampoo rack, a stool and the like;

kitchen wares such as a top and doors of system kitchen, a sink, a dishpan, a sink tidy, a dish drainer basket, a cleaner rack and the like;

toilet wares such as a toilet seat, a toilet paper holder, a toilet tidy, a water storage tank, a towel horse, a toilet brush and its case, and the like;

sanitary care goods such as a portable toilet, a simplified toilet seat, a handrail and the like;

washup goods such as a washstand, a stand for tubes, a tooth glass, a tray, a towel horse, a mirror frame and the like;

cleaning goods such as a bucket, a compost bin, a basin, a trash bin and the like;

storage goods such as a clothes case, a rollaway rack, hooks and the like;

baby goods such as a chamber pot, a training chair, a baby sink, a foot stool, a feeding bottle box and the like.

Furthermore, the molded articles may also be used for parts of house which are prone to attract annoying dirt, for example, sashes, floor sheets, wallpapers, chemical tatami mats, cabinets of television set or radio, audio racks, refrigerator linings and the like.

PREFERRED EMBODIMENTS OF THE INVENTION

The present invention is further illustrated specifically by the following examples. However the present invention is not restricted by these examples in any way.

Synthesis of Copolymers Having Perfluoroalkyl Groups of 5–18 Carbon Atoms

These copolymers can be prepared by the methods described in, for example, Japanese Patent Publication Nos. H4-68006 A, H6-116340 A, S57-11324 B, S57-11325 B, and S60-215023 A. The method of synthesizing the copolymers used in Examples, including Comparative Examples, are described in the following Reference Examples.

Reference Example 1

A 3-L flask was charged with 600 g of the compound represented by the following formula:

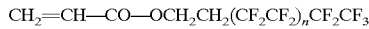

$CH_2=CH-CO-OCH_2CH_2(CF_2CF_2)_nCF_2CF_3$ (n=3 on the average), 400 g of polyoxyethylene (n=8) acrylate, 50 g of laurylmercaptan, and 1 L of isopropanol (IPA), heated to 70° C., and the inside space of the flask was then purged with nitrogen for 30 minutes. To the content, 10 g of azobisisobutyronitrile (AIBN) was added, and the mixture was allowed to react for 10 hours under reflux of IPA. At the point when the rate of polymerization analyzed by gas chromatography exceeded 98%, IPA was evaporated off under reduced pressure. The polymerization product was discharged onto a tray, cooled, and then ground into powder.

Reference Example 2

A 3-L flask was charged with 400 g of the same perfluoroacrylate as in Reference Example 1,300 g of polyoxyethylene (n=8) methacrylate, 300 g of stearyl methacrylate, 100 g of laurylmercaptan, 1 L of isopropanol (IPA), heated to 70° C., and the inside space of the flask was then purged with nitrogen for 30 minutes. To the content, 10 g of AIBN was added, and the reaction was allowed to proceed for 10 hours under reflux of IPA. At the point when the rate of polymerization analyzed by gas chromatography exceeded 98%, IPA was removed by evaporation under reduced pressure. The polymerization product was discharged onto a tray, cooled, and then ground into powder.

Reference Example 3

Into a 1.5-L glass reactor vessel, 526 g of the following compound:

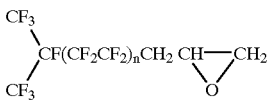

$$\begin{array}{c} CF_3 \\ \phantom{CF_3}\backslash \\ \phantom{CF_3}CF(CF_2CF_2)_nCH_2\,CH\!\!-\!\!-\!\!CH_2 \\ \phantom{CF_3}/ \phantom{CF(CF_2CF_2)_nCH_2}\backslash\phantom{-}/ \\ CF_3 \phantom{CF(CF_2CF_2)_nCH_2CH\!\!--}O \end{array}$$

(n=3.5 on the average), 120 g of phenyl glycidyl ether, 238 g of phthalic anhydride, and 41 g of acetic anhydride were placed, and heated to 130° C. on an oil bath. After the entire mixture melted, 0.72 g of N,N-dimethylbenzylamine was added, and the reaction was allowed to proceed for 10 hours while stirring. The reaction was terminated after confirming that the Rf-epoxy peak disappeared by the gas chromatography. After the completion of the reaction, the polymerization product was discharged onto a tray, cooled to solidify, and the solid thus obtained was ground into powder.

Reference Example 4

Into a 1.5-L glass reactor, 876 g of the following compound:

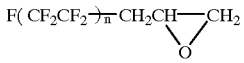

$$F(CF_2CF_2)_n\!\!-\!\!CH_2CH\!\!-\!\!-\!\!CH_2$$

(n=5 on the average), 31 g of succinic anhydride, and 104 g of phthalic anhydride were placed, and heated to 140° C. on an oil bath. To this mixture, 1.00 g of N,N-dimethylbenzylamine was added, and the reaction was allowed to proceed for 15 hours while stirring. The reaction was then terminated after confirming that the Rf-epoxy peak corresponding to the compound of the above formula disappeared by the gas chromatography. After the completion of the reaction, the polymerization product was discharged onto a tray, cooled to solidify, and the solid thus obtained was ground into powder.

Reference Example 5

Into a 0.5-L glass reactor, 96.7 g of the following compound:

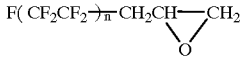

$$F(CF_2CF_2)_n\!\!-\!\!CH_2CH\!\!-\!\!-\!\!CH_2$$

(n=5 on the average), 3.3 g of phenyl glycidyl ether, and 300 g of trichlorotrifluoroethane were placed and stirred. One milliliter of boron trifluoride etherate was added so as to maintain the temperature at 30° C., and the mixture was stirred for 24 hours at 30° C. The reaction was then terminated after confirming that the Rf-epoxy peak corresponding to the compound of the above formula disappeared by the gas chromatography. After the completion of the reaction, the polymerization product was put into a large amount of methanol to reprecipitate the polymer for purification.

Reference Example 6

Into a 2-L flask, 400 g of the following compound:

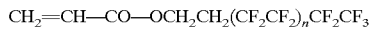

(n=3 on the average), 300 g of stearyl methacrylate, 50 g of laurylmercaptan, and 1 L of IPA were charged, heated to 70° C., and then the inside space of the flask was purged with nitrogen for 30 minutes. To the content, 10 g of AIBN was added, and the reaction was allowed to proceed for 10 hours under reflux of IPA. At the point when the rate of polymerization analyzed by gas chromatography exceeded 98%, IPA was evaporated off under reduced pressure. The polymerization product was discharged onto a tray, cooled, and then ground into powder.

EXAMPLE 1

One part by weight of the perfluoroalkyl group-containing polymer obtained in Reference Example 1 was added to 100 parts by weight of polypropylene (K1016 available from Nihon Chisso), melt-blended at 180° C. with a twin-screw extruder, and then press molded. The molded product was heated at 100° C. for one hour.

EXAMPLE 2

A molded product was obtained as described in Example 1 with the exception that two parts by weight of the perfluoroalkyl group-containing polymer obtained in Reference Example 1 was added.

EXAMPLE 3

A molded product was obtained as described in Example 1 with the exception that 0.5 part by weight of the perfluoroalkyl group-containing polymer obtained in Reference Example 1 was added.

EXAMPLE 4

A molded product was obtained as described in Example 1 with the exception that one part by weight of the perfluoroalkyl group-containing polymer obtained in Reference Example 2 was added instead of one part by weight of the perfluoroalkyl group-containing polymer obtained in Reference Example 1.

EXAMPLE 5

A molded product was obtained as described in Example 1 with the exception that two parts by weight of the perfluoroalkyl group-containing polymer obtained in Reference Example 2 was added instead of one part by weight of the perfluoroalkyl group-containing polymer obtained in Reference Example 1.

EXAMPLE 6

A molded product was obtained as described in Example 1 with the exception that one part by weight of the perfluoroalkyl group-containing polymer obtained in Reference Example 3 was added instead of one part by weight of the perfluoroalkyl group-containing polymer obtained in Reference Example 1.

EXAMPLE 7

A molded product was obtained as described in Example 1 with the exception that 0.5 part by weight of the perfluoroalkyl group-containing polymer obtained in Reference Example 3 was added instead of one part by weight of the perfluoroalkyl group-containing polymer obtained in Reference Example 1.

EXAMPLE 8

A molded product was obtained as described in Example 1 with the exception that one part by weight of the perfluoroalkyl group-containing polymer obtained in Reference Example 4 was added instead of one part by weight of the perfluoroalkyl group-containing polymer obtained in Reference Example 1.

EXAMPLE 9

A molded product was obtained as described in Example 1 with the exception that two parts by weight of the perfluoroalkyl group-containing polymer obtained in Reference Example 4 was added instead of one part by weight of the perfluoroalkyl group-containing polymer obtained in Reference Example 1.

EXAMPLE 10

A molded product was obtained as described in Example 1 with the exception that one part by weight of the perfluoroalkyl group-containing polymer obtained in Reference Example 1 was added to 100 parts by weight of polyethylene (Suntec M-6454 available from Asahi Chemical Industry Co., Ltd.).

EXAMPLE 11

A molded product was obtained as described in Example 10 with the exception that two parts by weight of the perfluoroalkyl group-containing polymer obtained in Reference Example 1 was added.

EXAMPLE 12

A molded product was obtained as described in Example 10 with the exception that 0.5 part by weight of the perfluoroalkyl group-containing polymer obtained in Reference Example 2 was added.

EXAMPLE 13

A molded product was obtained as described in Example 10 with the exception that one part by weight of the perfluoroalkyl group-containing polymer obtained in Reference Example 3 was added.

EXAMPLE 14

A molded product was obtained as described in Example 10 with the exception that one part by weight of the perfluoroalkyl group-containing polymer obtained in Reference Example 4 was added.

EXAMPLE 15

One part by weight of the perfluoroalkyl group-containing polymer obtained in Reference Example 1 was added to 100 parts by weight of a phenolic resin (PM840J available from Sumitomo Bakelite Co. Ltd.), and uniformly dispersed into the resin by kneading well. The resin composition was then molded into a given shape under the conditions of the mold temperature of 165° C. and the curing rate of 3 minutes to prepare a test piece. The molded product was then heated at 100° C. for one hour.

EXAMPLE 16

One part by weight of the perfluoroalkyl group-containing polymer obtained in Reference Example 3 was added to 100 parts by weight of an unsaturated polyester resin (AP301B available from Toshiba Chemical Corp.), and uniformly dispersed into the resin by kneading well. The resin composition was then molded into a given shape under the conditions of a mold temperature of 145° C. and a curing rate of 3 minutes to prepare a test piece. The molded product was then heated at 100° C. for one hour.

EXAMPLE 17

A molded product was obtained as described in Example 1 with the exception that one part by weight of the perfluoroalkyl group-containing polymer obtained in Reference Example 5 was added.

Comparative Example 1

A molded product was obtained as described in Example 1 with the exception that no perfluoroalkyl group-containing polymer was added.

Comparative Example 2

A molded product was obtained as described in Example 1 with the exception that one part by weight of an ester derived from a perfluoroalkyl alcohol and stearic acid was added instead of the perfluoroalkyl group-containing polymer.

Comparative Example 3

A molded product was obtained as described in Example 1 with the exception that one part by weight of the perfluoroalkyl group-containing polymer obtained in Reference Example 6 was added instead of one part by weight of the perfluoroalkyl group-containing polymer obtained in Reference Example 1.

Comparative Example 4

A molded product was obtained as described in Example 10 with the exception that no perfluoroalkyl group-containing polymer was added.

Comparative Example 5

A molded product was obtained as described in Example 15 with the exception that no perfluoroalkyl group-containing polymer was added.

Comparative Example 6

A molded product was obtained as described in Example 16 with the exception that no perfluoroalkyl group-containing polymer was added.

Contact angles of water and an oil (n-hexadecane) on the molded products obtained in the above Examples and Comparative Examples are shown in Table 1.

TABLE 1

| Contact angle | Example | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Water | 102 | 104 | 102 | 100 | 105 | 112 | 108 | 108 | 115 | 101 | 105 | 103 | 108 | 107 | 85 | 82 | 104 |
| n-hexadecane | 53 | 55 | 53 | 43 | 48 | 60 | 55 | 63 | 75 | 45 | 54 | 43 | 60 | 62 | 48 | 53 | 45 |

(units in °)

TABLE 2

| Contact angle | Comparative Example | | | | | |
|---|---|---|---|---|---|---|
| | 1 | 2 | 3 | 4 | 5 | 6 |
| Water | 102 | 102 | 102 | 100 | 76 | 74 |
| n-hexadecane | 10 | 15 | 20 | 10 | 14 | 16 |

(units in °)

What is claimed is:

1. A resin composition comprising:
   100 parts by weight of a thermoplastic resin or a thermosetting resin and
   0.1 to 5 parts by weight of at least one perfluoroalkyl group-containing polymer selected from the group consisting of a copolymer of a (meth)acrylic ester having a perfluoroalkyl group of 5–18 carbon atoms and a (meth)acrylic ester having a hydrophilic group, a homopolymer of an epoxy compound having a perfluoroalkyl group of 5–18 carbon atoms, and a copolymer of said epoxy compound and a monomer copolymerizable therewith.

2. A process for producing a resin molded article, which comprises:
   molding a resin composition comprising (A) 100 parts by weight of a thermoplastic resin selected from the group consisting of polyethylene, polypropylene and an acrylic resin or a thermosetting resin selected from the group consisting of an epoxy resin, a phenolic resin and an unsaturated polyester resin, and (B) 0.1 to 5 parts by weight of at least one perfluoroalkyl group-containing polymer selected from the group consisting of a copolymer of a (meth)acrylic ester having a perfluoroalkyl group of 5–18 carbon atoms and a (meth)acrylic ester having a hydrophilic group, a homopolymer of an epoxy compound having a perfluoroalkyl group of 5–18 carbon atoms, and a copolymer of said epoxy compound and a monomer coplymerizable therewith; and heat treating the resin composition at a temperature of 70 to 130° C.

3. A resin molded article produced by a process which comprises:

molding a resin composition comprising (A) 100 parts by weight of a thermoplastic resin selected from the group consisting of polyethylene, polypropylene and an acrylic resin or a thermosetting resin selected from the group consisting of an epoxy resin, a phenolic resin and an unsaturated polyester resin, and (B) 0.1 to 5 parts by weight of at least one perfluoroalkyl group-containing polymer selected from the group consisting of a copolymer of a (meth)acrylic ester having a perfluoroalkyl group of 5–18 carbon atoms and a (meth)acrylic ester having a hydrophilic group, a homopolymer of an epoxy compound having a perfluoroalkyl group of 5–18 carbon atoms, and a copolymer of said epoxy compound and a monomer coplymerizable therewith; and heat treating the resin composition at a temperature of 70 to 130° C.

4. The resin composition of claim 1, wherein the (meth) acrylic ester having a perfluoroalkyl group of 5–18 carbon atoms is selected from the group consisting of $CH_2=CHCOOC_2H_4C_6F_{13}$, $CH_2=C(CH_3)COOC_2H_4C_6F_{13}$, $CH_2=CHCOOC_2H_4C_8F_{17}$, $CH_2=C(CH_3)COOC_2H_4C_8F_{17}$, $CH_2=CHCOOC_2H_4C_{16}F_{33}$, $CH_2=C(CH_3)COOC_2H_4C_{16}F_{33}$, $CH_2=CHCOOC_3H_6(CF_2)_6CF(CF_3)_2$, $CH_2=C(CH_3)COOC_3H_6(CF_2)_6CF(CF_3)_2$, $CH_2=CHCOOC_3H_6(CF_2)_{10}CF(CF_3)_2$, $CH_2=C(CH_3)COOC_3H_6(CF_2)_6CF(CF_3)_2$, $CH2=CHCOOC_2H_4N(C_2H_5)SO_2(CF_2)_6CF_3$, and $CH_2=C(CH_3)COOC_2H_4N(C_2H_5)SO_2(CF_2)_6CF_3$.

5. The process of claim 2, wherein the (meth)acrylic ester having a perfluoroalkyl group of 5–18 carbon atoms is selected from the group consisting of $CH_2=CHCOOC_2H_4C_6F_{13}$, $CH_2=C(CH_3)COOC_2H_4C_6F_{13}$, $CH_2=CHCOOC_2H_4C_8F_{17}$, $CH_2=C(CH_3)COOC_2H_4C_8F_{17}$, $CH_2=CHCOOC_2H_4C_{16}F_{33}$, $CH_2=C(CH_3)COOC_2H_4C_{16}F_{33}$, $CH_2=CHCOOC_3H_6(CF_2)_6CF(CF_3)_2$, $CH_2=C(CH_3)COOC_3H_6(CF_2)_6CF(CF_3)_2$, $CH_2=CHCOOC_3H_6(CF_2)_{10}CF(CF_3)_2$, $CH_2=C(CH_3)COOC_3H_6(CF_2)_6CF(CF_3)_2$ $CH_2=CHCOOC_2H_4N(C_2H_5)SO_2(CF_2)_6CF_3$, and $CH_2=C(CH_3)COOC_2H_4N(C_2H_5)SO_2(CF_2)_6CF_3$.

6. The resin molded article of claim 3, wherein the (meth)acrylic ester having a perfluoroalkyl group of 5–18 carbon atoms is selected from the group consisting of $CH_2=CHCOOC_2H_4C_6F_{13}$, $CH_2=C(CH_3)COOC_2H_4C_6F_{13}$, $CH_2=CHCOOC_2H_4C_8F_{17}$, $CH_2=C(CH_3)COOC_2H_4C_8F_{17}$, $CH_2=CHCOOC_2H_4C_{16}F_{33}$, $CH_2=C(CH_3)COOC_2H_4C_{16}F_{33}$, $CH_2=CHCOOC_3H_6(CF_2)_6CF(CF_3)_2$, $CH_2=C(CH_3)COOC_3H_6(CF_2)_6CF(CF_3)_2$, $CH_2=CHCOOC_3H_6(CF_2)_{10}CF(CF_3)_2$, $CH_2=C(CH_3)COOC_3H_6(CF_2)_6CF(CF_3)_2$ $CH_2=CHCOOC_2H_4N(C_2H_5)SO_2(CF_2)_6CF_3$, and $CH_2=C(CH_3)COOC_2H_4N(C_2H_5)SO_2(CF_2)_6CF_3$.

7. The resin composition of claim 1, wherein the (meth) acrylic ester having a hydrophilic group is selected from the group consisting of $CH_2=CHCOO(CH_2CH_2O)_8H$, $CH_2=C(CH_3)COO(CH_2CH_2O)_{10}H$, $CH_2=CHCOO(C(CH_3)HCH_2O)_{10}H$, $CH_2=C(CH_3)COOCH_2CH_2OH$, $CH_2=CHCOOCH_2CH(OH)CH_2OH$, $CH_2=C(CH_3)COOCH_2CH(OH)CH_2Cl$, and $CH_2CHCOOCH_2CH_2OH$.

8. The process of claim 2, wherein the (meth)acrylic ester having a hydrophilic group is selected from the group consisting of $CH_2=CHCOO(CH_2CH_2O)_8H$, $CH_2=C(CH_3)COO(CH_2CH_2O)_{10}H$, $CH_2=CHCOO(C(CH_3)HCH_2O)_{10}H$, $CH_2=C(CH_3)COOCH_2CH_2OH$, $CH_2=CHCOOCH_2CH(OH)CH_2OH$, $CH_2=C(CH_3)COOCH_2CH(OH)CH_2Cl$, and $CH_2CHCOOCH_2CH_2OH$.

9. The resin molded article of claim 3, wherein the (meth)acrylic ester having a hydrophilic group is selected from the group consisting of $CH_2=CHCOO(CH_2CH_2O)_8H$, $CH_2=C(CH_3)COO(CH_2CH_2O)_{10}H$, $CH_2=CHCOO(C(CH_3)HCH_2O)_{10}H$, $CH_2=C(CH_3)COOCH_2CH_2OH$, $CH_2=CHCOOCH_2CH(OH)CH_2OH$, $CH_2=C(CH_3)COOCH_2CH(OH)CH_2Cl$, and $CH_2CHCOOCH_2CH_2OH$.

10. The resin composition of claim 1, wherein the epoxy compound having a perfluoroalkyl group of 5–18 carbon atoms is

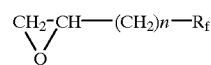

where n is 0, 1 or 2 and $R_f$ represents a perfluoroalkyl group having 5–18 carbon atoms.

11. The process of claim 2, wherein the epoxy compound having a perfluoroalkyl group of 5–18 carbon atoms is

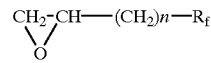

where n is 0, 1 or 2 and $R_f$ represents a perfluoroalkyl group having 5–18 carbon atoms.

12. The resin molded article of claim 3, wherein the epoxy compound having a perfluoroalkyl group of 5–18 carbon atoms is

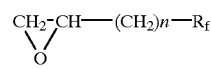

where n is 0, 1 or 2 and $R_f$ represents a perfluoroalkyl group having 5–18 carbon atoms.

13. The resin molded article of claim 3, wherein the resin molded article is selected from the group consisting of a bathtub, interior trim of bathroom units, a wash basin, a pail, a soap stand, a soap dish, a shampoo rack, a stool, a sink, a dishpan, a sink tidy, a dish drainer basket, a cleaner rack, a toilet seat, a toilet paper holder, a toilet tidy, a water storage tank, a towel horse, a toilet brush and its case, a portable toilet, a handrail, a washstand, a stand for tubes, a tooth glass, a tray, a mirror frame, a bucket, a compost bin, a basin, a trash bin, a clothes case, a rollaway rack, a hook, a chamber pot, a training chair, a baby sink, a foot stool, a feeding bottle box, a sash, a floor sheet, wallpaper, a chemical tatami mat, a television cabinet, a radio cabinet, and a refrigerator lining.

\* \* \* \* \*